United States Patent
Komine et al.

(10) Patent No.: US 6,649,268 B1
(45) Date of Patent: Nov. 18, 2003

(54) OPTICAL MEMBER MADE OF SILICA GLASS, METHOD FOR MANUFACTURING SILICA GLASS, AND REDUCTION PROJECTION EXPOSURE APPARATUS USING THE OPTICAL MEMBER

(75) Inventors: Norio Komine, Sagamihara (JP); Seishi Fujiwara, Sagamihara (JP); Akiko Yoshida, Kawasaki (JP); Hiroki Jinbo, Yokohami (JP); Norihisa Yamaguchi, Sagamihara (JP)

(73) Assignee: Nikon Corporation, Tokyo (JP)

( * ) Notice: Subject to any disclaimer, the term of this patent is extended or adjusted under 35 U.S.C. 154(b) by 6 days.

(21) Appl. No.: 09/520,190

(22) Filed: Mar. 7, 2000

(30) Foreign Application Priority Data

| Mar. 10, 1999 | (JP) | 1999/063258 |
| Mar. 30, 1999 | (JP) | 1999/088488 |
| Apr. 2, 1999 | (JP) | 1999/095982 |

(51) Int. Cl.⁷ .................................. C03B 8/04
(52) U.S. Cl. ............... 428/426; 359/642; 423/335; 423/336; 65/17.4
(58) Field of Search .............. 428/409, 410, 428/426; 423/335, 336; 65/36, 37, 17.4; 359/642, 343

(56) References Cited

U.S. PATENT DOCUMENTS

| 4,038,370 A | 7/1977 | Tokimoto et al. ........... 423/336 |
| 4,113,844 A | 9/1978 | Tokimoto et al. ........... 423/336 |
| 6,189,339 B1 * | 2/2001 | Hiraiwa .................... 65/17.3 |

FOREIGN PATENT DOCUMENTS

| CA | 2079699 | 4/1994 |
| EP | 0 622 340 A1 | 11/1994 |
| EP | 0 735 006 A1 | 10/1996 |
| EP | 0 870 737 A1 | 10/1998 |
| EP | 0 878 451 A1 | 11/1998 |
| JP | A-6-305736 | 11/1994 |
| JP | A-7-63680 | 3/1995 |

* cited by examiner

Primary Examiner—Deborah Jones
Assistant Examiner—Stephen Stein

(57) ABSTRACT

An optical member made of silica glass manufactured by the direct method where a material gas comprising an organo-silicon compound is allowed to react in an oxidizing flame, said optical member having a $2 \times 10^{14}$ molecules/cm³ or less concentration of formyl radical generated by X-ray irradiation whose dose is 0.01 Mrad or more and 1 Mrad or less.

13 Claims, 9 Drawing Sheets

OPTICAL MEMBER MADE OF SILICA GLASS, METHOD FOR MANUFACTURING SILICA GLASS, AND REDUCTION PROJECTION EXPOSURE APPARATUS USING THE OPTICAL MEMBER

BACKGROUND OF THE INVENTION

1. Field of the Invention

The present invention relates to an optical member, a method for manufacturing silica glass, and a reduction projection exposure apparatus; and more particularly, it relates to an optical member made of silica glass suitable for use in a reduction projection exposure apparatus or the like utilizing vacuum ultraviolet light such as an ArF excimer laser, a method for manufacturing the silica glass, and a reduction projection exposure apparatus using the optical member.

2. Related Background Art

Conventionally, a reduction projection exposure apparatus (photolithography apparatus) such as a stepper is used in a process of transferring a fine pattern of an integrated circuit onto a wafer of silicon or the like in case where ICs (Integrated Circuits) and LSIs (Large Scale Integrated Circuits) are manufactured. For this reduction projection exposure apparatus wider exposure areas and higher resolution over that entire exposure area have been required and improvement of the apparatus has been researched by shortening the wavelength of light emitted from the exposure light source or by increasing the numerical aperture (NA) of the projection optical system or the like. Particularly shortening the wavelength of light is very effective in improving the resolution of the apparatus which causes the shift from a g-line (436 nm) to an i-line (365 nm), farther to a KrF excimer laser (248 nm) or an ArF excimer laser (193 nm).

On the other hand, for optical members making up an optical system of a reduction projection exposure apparatus, high light transmission property and ultraviolet light resistance are required suitable for the usage of light having such a short wavelength. For example, optical members used in a projection optical system of a stepper are required to have high light transmission property with internal absorption loss coefficient of 0.001 $cm^{-1}$ with respect to light having a short wavelength as described above, that is a light absorption amount of 0.1% or less per 1 cm of thickness.

However, conventional optical glass used in an optical system of a reduction projection exposure apparatus utilizing a g-line or an i-line doesn't have a sufficient transmission property with respect to light of which the wavelength is shorter than that of the i-line and exhibits little transmittance with respect to light having a wavelength of 250 nm or less. Therefore, an optical member using silica glass or calcium fluoride crystal which exhibit higher light transmission property with respect to light having such a short wavelength has been under development.

As for a synthesis method of said silica glass, a vapor phase synthesis method called the direct method utilizing silicon tetrachloride as the materials is used conventionally. In this method, first, by ejecting high purity silicon tetra chloride gas as a material from the central portion of a burner made of silica glass with a multi-tubular structure and by ejecting oxygen gas and hydrogen gas from the peripheral portion of a material ejecting opening, fine particles of silica glass are synthesized through a hydrolytic reaction between silicon tetrachloride and the water which is generated through burning of oxygen and hydrogen. And the fine particles of silica glass are deposited on a target rotating, rocking and moving downwardly under said burner, which is fused and vitrified by combustion heat of the hydrogen gas to obtain a silica glass ingot. Silicon tetrachloride as a material is generally ejected by diluting with a carrier gas and in many cases oxygen gas is utilized as the carrier gas. As for the target for depositing the fine particles of silica glass, the one made of an opaque silica glass board is usually used.

However, the above mentioned method has the disadvantage that hydrogen chloride is generated at the time of synthesizing, and optical members made of silica glass obtained by this method have problems in regard to ultraviolet light resistance such as significant lowering of light transmission property when they are irradiated with ultraviolet light of high output or excimer laser beam for a long period of time. This lowering of light transmission property is due to the appearance of an absorption band of 5.8 eV called the E' center, which is considered to be induced by chloride remaining in the silica glass in a concentration of from 30 to 150 ppm.

Examination into a method for manufacturing silica glass using organosilicon compound which doesn't contain substantial amounts of chloride as the material for the purpose of improving the above mentioned problems has been being carried out in recent years. However, in the case of silica glass obtained by the method utilizing the organosilicon compound as the material, the internal absorption coefficient for light having a wavelength of 210 nm or less exhibits 0.01 $cm^{-1}$ or more. Therefore, in case such an optical member made of silica glass is used as a lens of an optical system or the like, sufficient resolution cannot be achieved in a reduction projection exposure apparatus or the like utilizing an ArF excimer laser (193.4 nm).

In this way, an optical member made of silica glass with desirable light transmittance and ultraviolet light resistance suitable for use with light having a short wavelength such as the ArF excimer laser hasn't yet been developed.

SUMMARY OF THE INVENTION

Therefore, it is the purpose of the invention to provide an optical member made of silica glass with high light transmission property and ultraviolet light resistance suitable for use in an optical system of a reduction projection exposure apparatus using an ArF excimer laser as a light source or the like, a method for manufacturing the silica glass, and a reduction projection exposure apparatus using the optical member.

As a result of repeated diligent studies to achieve the above described purpose, the present inventors found that formyl radical generated by the exposure of X-rays into silica glass affects the optical quality of the silica glass and it is possible to control the concentration of the formyl radical by selecting conditions such as a ratio between a hydrogen gas and an oxygen gas ejected from a burner and kinds or flow amounts of the materials and the carrier gas in a method for manufacturing silica glass by the direct method. And based on those findings the present invention has been accomplished where silica glass with low concentration of formyl radical generated by the exposure of X-rays can be obtained to solve the above mentioned problems by using such silica glass as material for optical members by allowing the tube placed in the center of the burner with multi-tubular structure to eject an organosilicon compound and an inactive gas and by allowing the tube placed around the tube placed in the center to eject an oxygen gas and a hydrogen gas so that the ratio of the total oxygen gas amount to the total hydrogen gas amount becomes 0.53 or more, so as to allow the above organosilicon compound to react in the oxidizing flame in the method for manufacturing silica glass by the direct method.

Namely, an optical member according to the present invention is:

an optical member made of silica glass synthesized by the direct method where a material gas comprising an organosilicon compound is allowed to react in an oxidizing flame, said optical member having a $2 \times 10^{14}$ molecules/cm$^3$ or less concentration of formyl radical generated by X-ray irradiation whose dose is 0.01 Mrad or more and 1 Mrad or less.

Furthermore, a method according to the present invention is:

a method for manufacturing silica glass comprising:

a first step of allowing an organosilicon compound to react in an oxidizing flame while ejecting an organosilicon compound and an inactive gas from a tube placed in the center of a burner with a multi-tubular structure and ejecting an oxygen gas and a hydrogen gas a tube placed around the tube placed in the center of said burner so that a ratio (a/b) of the total oxygen gas amount (a) and the total hydrogen gas amount (b) being 0.53 or more, so as to obtain silica glass fine particles; and a second step where said silica glass particles are deposited on a target of heat resistance opposed to said burner and are melted and vitrified, so as to obtain a silica glass ingot.

Moreover, an apparatus according to the present invention is:

a reduction projection exposure apparatus having an exposure light source, a photomask formed with an original image of pattern, an irradiation optical system for irradiating said photomask with the light emitted from said light source, a projection optical system for projecting onto a photosensitive substrate a pattern image projected from said photomask, an alignment system for aligning said photomask and said photosensitive substrate with each other;

wherein at least a portion of the lenses making up said irradiation optical system, the lenses making up said projection optical system and said photomask is an optical member made of silica glass synthesized by the direct method where a material gas comprising an organosilicon compound is allowed to react in an oxidizing flame, said optical member having a $2 \times 10^{14}$ molecules/cm$^3$ or less concentration of formyl radical generated by X-ray irradiation whose dose is 0.01 grad or more and 1 Mrad or less.

According to the present invention, in a method for manufacturing silica glass by the direct method, the residue of carbon in the obtained silica glass is controlled by allowing an organosilicon compound to react in an oxidizing flame while ejecting an organosilicon compound and an inactive gas from the tube placed in the center of the burner with multi-tubular structure and ejecting oxygen gas and hydrogen gas from the tube arranged around the tube placed in the center with a ratio (a/b) of the total oxygen gas amount (a) to the total hydrogen gas amount (b) being 0.53 or more, so that silica glass of which the concentration of formyl radical generated by the irradiation of X-rays is $2 \times 10^{14}$ molecules/cm$_3$ or less can be obtained. And by using an optical member comprising silica glass obtained by such a method in an optical system of a reduction projection exposure apparatus, light transmission property and ultraviolet light resistance of the entire optical system can be enhanced against light having a short wavelength such as vacuum ultraviolet light or an excimer laser beam, therefore high resolution can be achieved in the above mentioned apparatus which couldn't be obtained in the case when an optical member according to the prior art is used.

DESCRIPTION OF THE PREFERRED EMBODIMENTS

Figure 1:
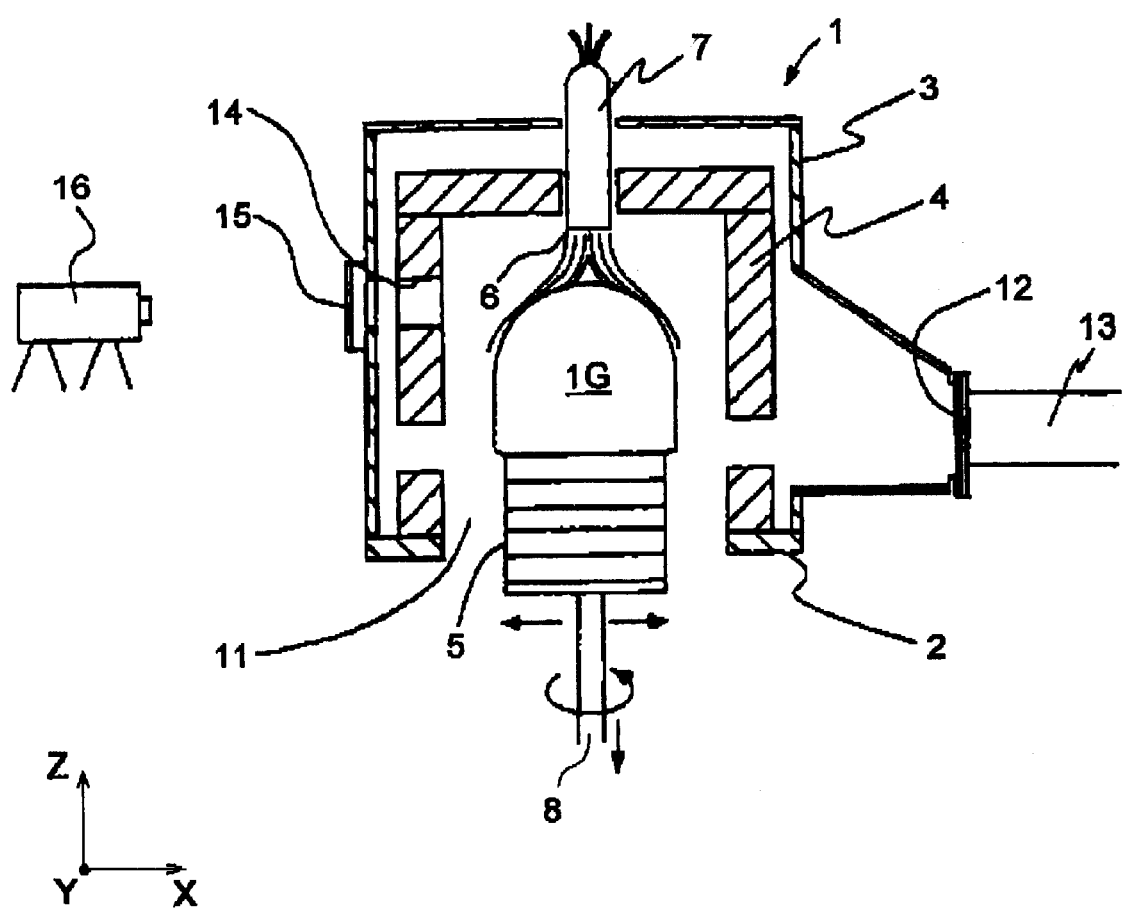
FIG. 1 is a schematic configuration view showing an example of a silica glass manufacturing apparatus used in a method for manufacturing silica glass according to the present invention.

The present invention is described in detail in the following.

An optical member according to the present invention comprises silica glass manufactured by the direct method where a material gas comprising an organosilicon compound is allowed to react in an oxidizing flame, and the optical member has a $2 \times 10^{14}$ molecules/cm$^3$ or less concentration of formyl radical generated by the radiation of X-rays with an irradiation dose of 0.01 Mrad or more and 1 Mrad or less, wherein the formyl radical is represented in the following formula (1):

$$H\text{—}C.\text{=}O \tag{1}$$

(where . represents an unpaired electron)

The generation mechanism of the formyl radical hasn't yet been clarified but the present inventors presume the following mechanism. That is to say it is considered that, in a synthesizing process of silica glass, carbon monoxide (CO) residue within the silica glass is generated through the incomplete combustion of the organosilicon compound and goes through the reaction by the irradiation of X-rays according to the following formula (2):

$$CO+H^0 \rightarrow H\text{—}C^*\text{=}O \tag{2}$$

(where $H^0$ represents a hydrogen radical and * represents an unpaired electron)

$H^0$ in the reaction of formula 2 is considered to be generated in the reaction according to the following formulas (3) or (4):

$$\equiv Si\text{—}OR \rightarrow (X\text{-ray irradiation}) \rightarrow \equiv Si\text{—}O^* + H^0 \tag{3}$$

$$H_2 \rightarrow (X\text{-ray irradiation}) \rightarrow H^0 + H^0 \tag{4}$$

(where ≡ is not a triple bond but represents the combination of three oxygen atoms and * represents an unpaired electron.)

This formyl radical is not recognized as being generated in the case that light such as an ArF excimer laser or a KrF excimer laser is irradiated. The irradiated X-rays, such as X-rays emitted from a rhodium (Rh) tubular bulb where a voltage of 50 kV and a current of 2 mA are applied, are cited and those X-rays are irradiated for 22 seconds to have an irradiation dose of about 0.01 Mrad.

As for a method to determine the concentration of the formyl radical generated in the optical member, a method using an Electron Spin Resonance Spectrometer is specifically cited. Furthermore, methods such as combustion—infrared spectroscopic analysis, charged particle radio activation analysis, inductively coupled plasma atomic emission spectroscopy (ICP-AES), inductively coupled plasma mass spectroscopy (ICP-MS) known as a carbon content measuring method conventionally tend to have insufficient precision of the measurement in the case of determining the trace amounts of carbon content in this way.

In an optical member according to the present invention, it is preferable that the internal absorption coefficient for a light having a wavelength of 190 nm or more be 0.001 cm$^{-1}$ or less. In case the internal absorption coefficient exceeds 0.001 cm$^{-1}$, a sufficient resolution tends not to be obtained in a reduction projection exposure apparatus where the member is used in the optical system. A measuring method of the internal absorption coefficient such as a method using a spectrophotometer for ultraviolet light can be cited.

Though an optical member according to the present invention comprises silica glass manufactured from organosilicon compound which doesn't include substantial amounts of chloride, it is preferable that the chlorine concentration in the optical member be lower in order to further increase endurance, more concretely that the chlorine concentration be 0.1 ppm or less. In case the chlorine concentration exceeds 0.1 ppm in concentration, ultraviolet light resistance of the optical member tends to be insufficient. A method to determine the chlorine atom concentration such as radioactivation analysis using thermal neutron irradiation can be cited.

In addition, in an optical member according to the present invention, it is preferable that hydrogen molecule concentration be $1 \times 10^{16}$/cm$^3$ or more and $4 \times 10^{18}$/cm$^3$ or less. In case the hydrogen molecule concentration is not in the above mentioned range, the ultraviolet light resistance of the optical member tends to be insufficient. As a measuring method of the hydrogen molecule concentration, there is a method using a laser Raman spectrophotometer.

In addition, in an optical member according to the present invention, it is preferable that the hydroxyl group concentration in the member be 800 ppm or more and 1300 ppm or less. In case the hydroxyl group concentration is less than 800 ppm, the light transmittance tends to be insufficient and in case it exceeds 1300 ppm, the refractive index of the member tends to increase or birefringence tends to be caused when vacuum ultraviolet light is irradiated. A measuring method of the hydroxyl group concentration such as a method of measuring absorption amounts of 1.38 μm belonging to the hydroxyl group using an infrared spectrophotometer.

And in an optical member according to the present invention, it is preferable that the contents of impurities such as Alkaline metals like sodium (Na) and potassium (K); Alkaline earth metals like magnesium (Mg) and calcium (Ca); transition metals like titanium (Ti), vanadium (V) chromium (Cr) and manganese (Mn) and metals like aluminum (Al) be low, and more concretely it is preferable that the total concentration of those metal impurities be 50 ppb or less. In case the total concentration of the metal impurities exceeds 50 ppb, the light transmission property and ultraviolet light resistance of the optical member tends to be insufficient. Particularly, it is preferable that the sodium concentration among those metal impurities be 20 ppb or less. In case the sodium concentration exceeds 20 ppb, the light transmittance of the optical member tends to decrease significantly. A method of determining the quantity of sodium and potassium such as radioactivation analysis through irradiation of thermal neutrons can be cited, and a method of determining the quantity of alkaline earth metal, transition metal and aluminum such as inductively coupled plasma atomic emission spectroscopy can be cited.

In this way, an optical member according to the present invention having a high light transmission property and ultraviolet light resistance makes it possible to transfer a pattern with high resolution which can be achieved with an optical member according to the prior art in the case of use in lenses or the like structuring an optical system of a reduction projection exposure apparatus. It is preferable that the above mentioned optical member has a high initial transmittance with respect to light, small absorption amount induced by light, small refractive index increase and a small maximum birefringence with respect to the tendency for obtaining higher levels of image function. More concretely, it is preferable that the initial internal transmittance with respect to light emitted from an ArF excimer laser be 99.5%/cm. And it is preferable that the absorption amount induced by irradiation with $1 \times 10^6$ pulses of light with an energy density of 400 mJ/cm$^2$*p emitted from an ArF excimer laser be 0.2 cm$^{-1}$ or less; that increased amount of refractive index after irradiation with $1 \times 10^6$ or pulses of light with an energy density of 400 mJ/cm$^2$*p emitted from an ArF excimer laser be $1.5 \times 10^{-6}$ or less; and that the maximum birefringence 2.5 nm/cm or less. A method of measuring the internal transmittance and the absorption amount induced by light irradiation such as a method using a double beam type spectrophotometer with a parallel beam can be cited; as for a method of measuring the increased amount of refractive index such as a method using a Fizeau type interferometer with He—Ne laser as a light source can be cited; and a method of measuring the maximum birefringence such as an automatic double refraction measuring apparatus can be cited.

In this way, an optical member according to the present invention having an optical quality that conventional optical members couldn't previously attain could be achieved for the first time by using as its material silica glass obtained in a specific manufacturing method. A manufacturing method of silica glass which is used as material for an optical member according to the invention is described in the following.

FIG. 1 shows schematically an example of one apparatus used for manufacturing silica glass according to the present invention. In the silica glass manufacturing apparatus 1, a burner 7 made of silica has a multi-tubular structure, which is installed so that its tip 6 faces toward a target 5 from the top of the furnace. The furnace walls are constructed of a furnace frame 3 and a refractory 4, which is provided with a window for observation (not shown), a window 15 for monitoring with IR camera 16, and exhaust vent 12 connected to an exhaust duct 13. The target 5 for forming an ingot IG underneath the furnace, and the target 5 is connected to an XY stage (not shown) outside of the furnace through a support axis B. The support axis 8 is ratable by a motor so that the XY stage is two dimensionally movable in the direction of the X axis and the Y axis by an X axis servo motor and a Y axis servo motor.

An organosilicon compound and an inactive gas are ejected from a tube placed in the center of the burner 7 and a oxygen gas and a hydrogen gas are ejected from a tube arranged around the tube placed in said center with a ratio (a/b) of the total oxygen gas amount (a) to the total hydrogen gas amount (b) being 0.53 or more so that silica glass fine particles are produced by the reaction of said organosilicon compound in an oxidizing flame. Those silica glass fine particles are deposited on the target 5 rotating and rocking and at the same time are melted and vitrified to obtain an ingot IG of transparent silica glass. In this case the top of the ingot IG is covered in flame and the target is pulled down in the Z direction so that the position of the synthesizing plane in the upper part of the ingot is always maintained at an even distance from the burner.

The silica glass ingot obtained in this way is cut, processed and further optically polished and coated to fabricate optical members such as prisms, mirrors and lenses.

Under the manufacturing conditions of silica glass by the conventional direct method, the ratio of the oxygen gas amount to the hydrogen gas amount is set to have extra hydrogen ejected from the burner in order to enhance the hydrogen molecule concentration in the obtained silica glass. Manufacturing silica glass under such conditions has problem-free in the case silicon tetrachloride being used as a material because the reaction of silicon tetrachloride is dominated by hydrolytic reaction in the oxygen-hydrogen flame. However, in the case of an organosilicon compound being used as a material, the reaction of the organosilicon compound is dominated by an oxidizing reaction and not by the hydrolytic reaction, the oxygen amount necessary for the reaction would run out under the same condition as in the case silicon tetrachloride being used as a material. As a result, there are more carbon residues in the obtained silica glass compared to the case of silicon tetrachloride being used due to incomplete combustion of the organosilicon compound. The amount of carbon concentration is 1 ppm or less, which is difficult to determine in quantity by a usual analytic method such as combustion-infrared spectroscopic analysis, charged particle radioactivation analysis, ICP-AES (inductively coupled plasma atomic emission spectroscopy), XCP-MS (inductively coupled plasma mass spectroscopy), and no relationships have been found between optical quality of silica glass and carbon residue amount. Therefore, the present inventors measured formyl radical generated in the silica glass by the X-ray irradiation by utilizing an Electron Spin Resonance Spectrometer, ESR and have found out the interrelationships between the optical quality of silica glass and the carbon residue amount. A manufacturing method of silica glass according to the present invention is based on those findings by the inventors.

In a method according to the present invention, it is preferable that a kind selected from the group consisting of alkoxysilanes and siloxanes whose boiling point is 180° C. be used as a material. In case the boiling point of the material exceeds 180° C., the vaporization of the material tends to be incomplete, whereby inclusions such as bubbles may be taken into silica glass, or an incomplete combustion may occur. Substances related to alkoxysilane such as tetraethoxysilane (chemical formula: $Si(OC_2H_5)_4$, abbreviation: TEOS), tetramethoxysilane (chemical formula: $Si(OCH_3)_4$, abbreviation: TMOS) and methyltrimethoxysilane (chemical formula: $CR_3Si(OCH_3)_3$, abbreviation: MTMS) can be cited concretely. And substances related to siloxane such as octamethylcyclotetrasiloxane (chemical formula: $(SiO(CH_3)_2)_4$, abbreviation: OMCTS), hexamethyldisiloxane (chemical formula: $(CH_3)_3SiOSi(CH_3)_3$, abbreviation: HMDS) and tetramethylcyclotetrasiloxane (chemical formula: $(SiCH_3OH)_4$, abbreviation: TMCTS), can be cited concretely. As a carrier gas ejected together with the organosilicon compound, inactive gases such as nitrogen or helium are used in the present invention. This is based on the findings by the present inventors that in case oxygen is used as a carrier gas such as in the conventional manufacturing method, the carrier gas tends to causes a combustion of a substance such as a material in a tube of a burner by heat, whereby the obtained silica glass may be contaminated.

In a manufacturing method according to the present invention, the above mentioned organosilicon compound is reacted in the oxidizing flame where a ratio (a/b) of the total oxygen gas amount (a) to the total hydrogen gas amount (b) is 0.53 or more, and it is preferable that a ratio ([a−c]/b) of an oxygen gas amount (a−c) subtracting an oxygen gas amount (c) consumed by the combustion of said organosilicon compound from the total oxygen amount (a) to the total hydrogen gas amount (b) be 0.48 or more. In case a ratio ([a−c]/b) of an oxygen gas amount (a−c) subtracting an oxygen gas amount (c) consumed by the combustion of said organosilicon compound from the total oxygen amount (a) to the total hydrogen gas amount (b) is less than 0.48, the amount of carbon residue in the silica glass due to the incomplete reaction of the organosilicon compound increases resulting in the tendency of increased concentration of formyl radical generated during the X-ray irradiation.

Figure 2:
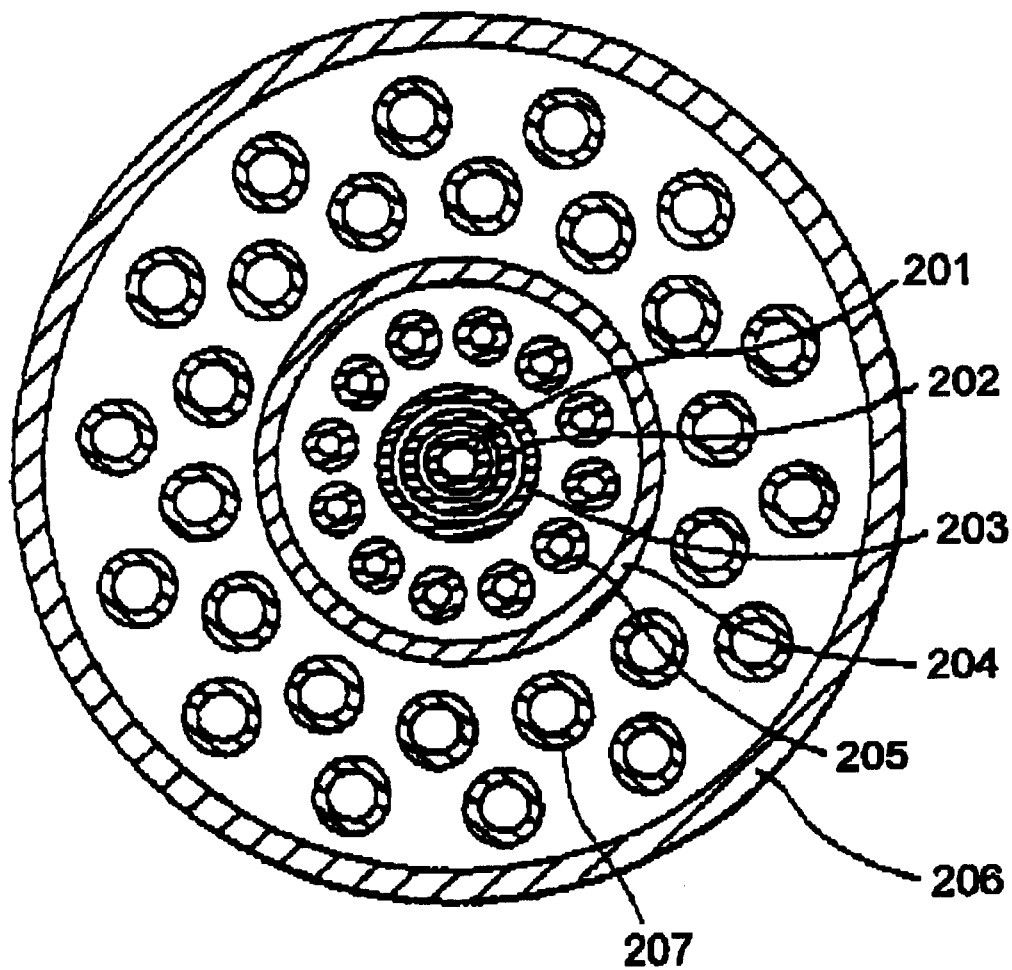
FIG. 2 is a schematic configuration view showing an example of a burner with a multi-tubular structure used in a method for manufacturing silica glass according to the present invention.

An example of a burner used in manufacturing silica glass according to the present invention is shown in FIG. 2. The burner of FIG. 2 comprises:

a first tube placed in the center 201 for ejecting an organosilicon compound and a carrier gas;

a second tube 202 placed in a co-centric circle around the first tube for ejecting a first hydrogen gas;

a third tube 203 placed in a co-centric circle around the second tube for ejecting a first oxygen gas;

a fourth tube 204 placed in a co-centric circle around the third tube for ejecting a second hydrogen gas;

a fifth set of tubes 205 arranged between the outer periphery of the fourth tube and the inner periphery of the fourth tube for ejecting a second oxygen gas;

a sixth tube 206 placed in a co-centric circle around the fourth tube for emitting a third hydrogen gas; and a seventh set of tubes 207 arranged between the outer periphery of the fourth tube and the inner periphery of the sixth tube for emitting a third oxygen gas. In the case of the organosilicon compound being liquid at room temperature, this is vaporized by a vaporizer and introduced into the first tube 201 through a mass flow controller with a carrier gas.

Silica glass according to the present invention can be manufactured suitably by maintaining a ratio (e/d) of the first oxygen gas amount (e) to the first hydrogen gas (d) at 0.50 or less and a ratio (g/f) of the second oxygen gas amount (g) to the second hydrogen gas amount (f) at 0.55 or more. By ejecting the oxygen gas and the hydrogen gas at the above mentioned ratios, silica glass with low hydroxyl group concentration and high hydrogen molecule concentration can be obtained without performing heat treatment under a hydrogen or oxygen atmosphere after the synthesizing process. And in an optical member using this as a material, higher light transmission property and ultraviolet light resistance tend to be obtained.

Figure 3A:
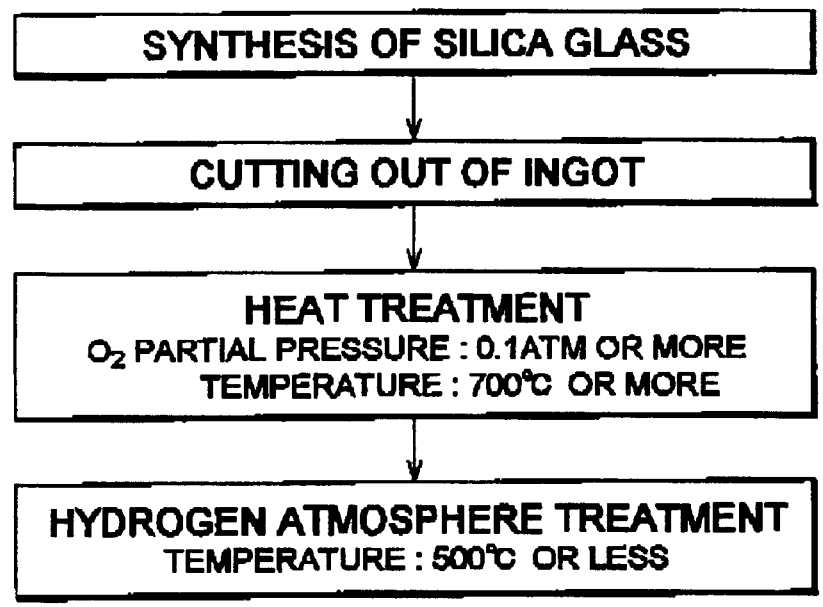
FIGS. 3A and 3B, respectively, are flow charts showing an example of a method for manufacturing silica glass according to the present invention.
Figure 3B:
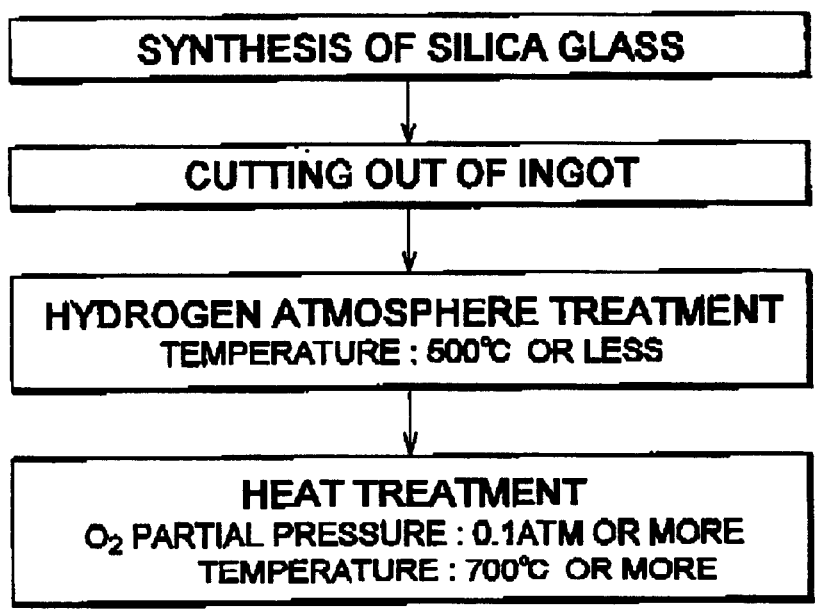

In said burner, by setting the ratio (e/d) of the first oxygen gas amount (e) to the first hydrogen gas amount (d) and the ratio (g/f) of the second oxygen gas amount (g) to the second hydrogen amount (f) at a level where oxygen is in excess relative to the theoretical burning ratio and by setting the ratio (i/h) of the third oxygen gas amount (i) to the third hydrogen amount (h) at a level where hydrogen is in excess relative to the theoretical burning ratio, silica glass fine particles are synthesized, said silica glass fine particles are deposited on the heat resistant target opposed to said burner and are melted to obtain a silica glass ingot, the obtained silica glass ingot is heat processed under an atmosphere including hydrogen so as to efficiently produce silica glass according to the present invention. By ejecting the hydrogen gas and the oxygen gas at the above mentioned ratios in the synthesizing process of the silica glass fine particles and by heat processing the obtained silica glass ingot under an atmosphere including hydrogen, silica glass with small carbon residue amounts and high hydrogen molecular concentrations is obtained, and in an optical member using this as a material, higher light transmission property and ultraviolet light resistance tend to be obtained. In addition, in said burner it is preferable that the ratio (e/d) of the first oxygen amount (e) to the first hydrogen gas amount (d) be 0.7 or more and 2.0 or less, the ratio (g/f) of the second oxygen gas amount (g) to the second hydrogen gas amount (f) be 0.5 or more and 1.0 or less, the ratio (i/h) of the third oxygen gas amount (i) to the third hydrogen gas amount (h) be 0.2 or more and 0.5 or less. And it is preferable that the flow rate of the first hydrogen gas be 60 m/sec or less. In case the flow rate of the first hydrogen gas exceeds 60 m/sec the reaction of the organosilicon compound leads to vitrification while being incomplete so that the carbon residue amount tends to increase in the obtained silica glass in addition, it is preferable that the hydrogen molecule concentration in the atmosphere for heat treating silica glass blocks be 5 wt % or more and 100 wt % or less, and it is preferable that the temperature of the atmosphere for heat treating silica glass blocks be 500° C. or less. In case the hydrogen molecule concentration in the atmosphere are less than 5 wt %, silica glass with high hydrogen molecular concentrations tends not to be obtained, and when the temperature of the atmosphere exceeds 500° C. alkaline impurities tend to diffuse in the silica glass. The manufacturing method shown in FIG. 3A, that is to say;

manufacturing silica glass by a method for performing heat processing of a cut out silica glass ingot in an atmosphere where the partial pressure of oxygen is 0.1 atm or more and the temperature is 700° C. or more and performing hydrogen processing under a temperature of 500° C. less; or the method shown in FIG. 3B, that is to say;

manufacturing silica glass by a method for performing hydrogen processing of a cut out silica glass ingot under a temperature of 500° C. or less and performing heat processing in an atmosphere where the partial pressure of oxygen is 0.1 atm or more and the temperature is 700° C. or more preferable because of the tendency where silica glass birefringence is lowered without lowering of ultraviolet light resistance of the silica glass, whereby homogeneity on a refractive index of the silica glass may be raised.

Next, an example of a reduction projection exposure apparatus using optical members according to the present invention is described.

Figure 4:
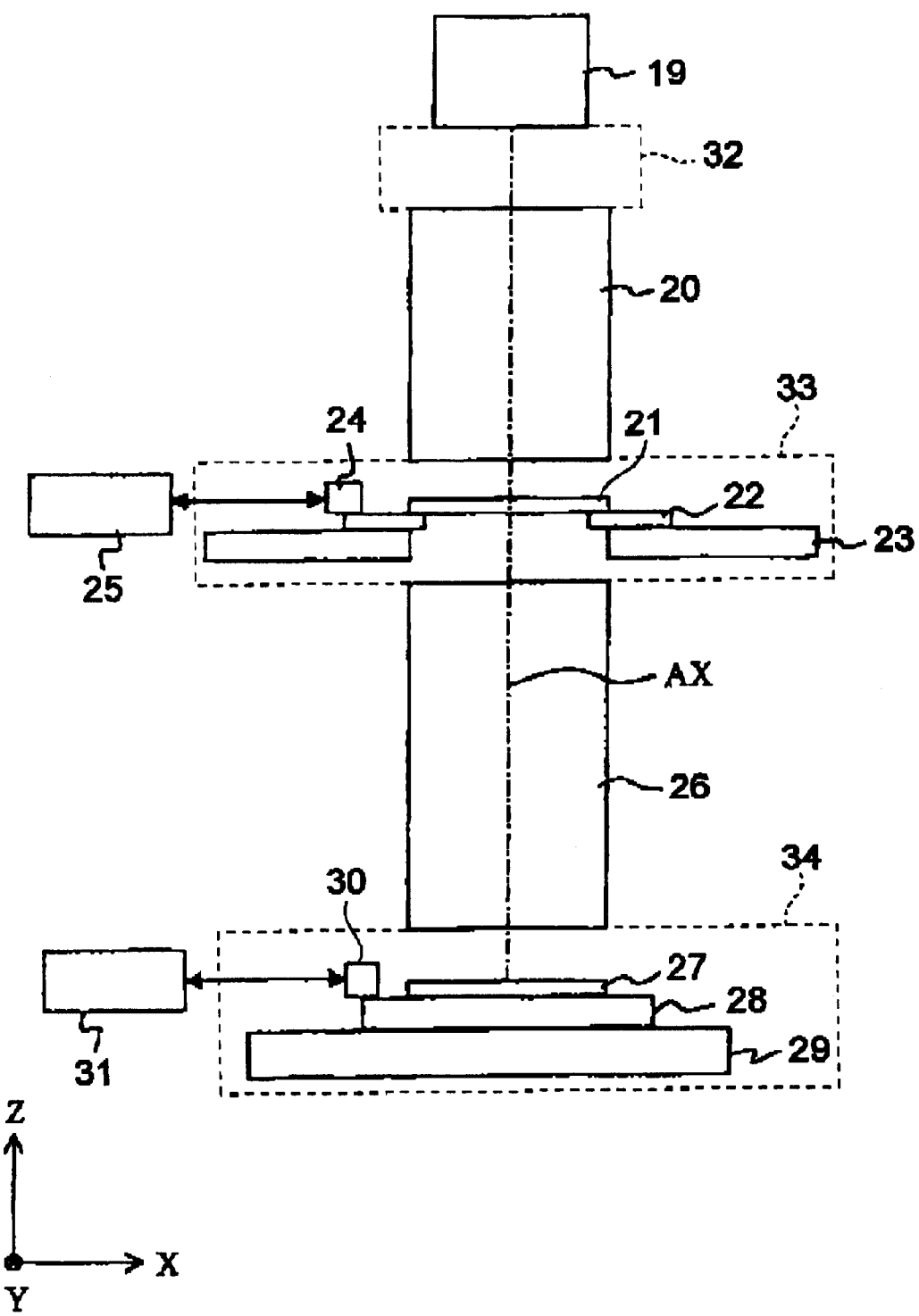
FIG. 4 is a schematic configuration view showing an example of a reduction projection exposure apparatus utilizing optical members according to the present invention.

FIG. 4 shows a schematic view illustrating the overall configuration of a reduction projection exposure apparatus equipped with a catadioptric optical system in accordance with the present invention. In FIG. 4, a Z axis parallel to an optical axis AX of a projection optical system 26, an X axis parallel to the view on the page of FIG. 4, and a Y axis perpendicular to the view on the page of FIG. 4 in a plane perpendicular to the optical axis are provided.

The reduction projection exposure apparatus of FIG. 4 is provided with a light source 19 for supplying irradiation light with a wavelength of 250 nm or less. Light emitted from light source 19 irradiates evenly over a photomask 21 where a predetermined pattern is formed through an irradiation optical system 20. A light source 19 such as a KrF excimer laser (248 nm), an ArF excimer laser (193 nm) and an $F_2$ laser (157 nm) can be cited.

In the optical path from the light source 19 to the illumination optical system 20, one or a plurality of bending mirrors for deflecting the optical path are disposed as necessary. Also, the illumination optical system 20 has an optical integrator, constituted by a flyeye lens or an inner surface reflection type integrator, for example, for forming a surface light source with a predetermined size/shape; a field stop for defining the size/shape of the illumination area on a photomask 21; and an optical system such as a field stop imaging optical system for projecting an image of the field stop onto the photomask 21. Further, the optical path between the light source 19 and the illumination optical system 20 is sealed with a casing 32, whereas the space extending from the light source 19 to the optical member closest to the photomask 21 in the illumination optical system 20 is substituted by an inert gas exhibiting a low absorption amount with respect to the exposure light.

By way of a mask holder 22, the photomask 21 is held parallel to the XY plane on a mask stage 23. The photomask 21 is formed with a pattern to be transferred; whereas, within the whole pattern area, a rectangular (slit-shaped) pattern area having longer sides along the Y axis and shorter sides along the X axis is illuminated.

The mask stage 23 is movable in a two-dimensional fashion along the mask surface (XY plane), whereas its positional coordinates are configured so as to be measured and positionally controlled by an interferometer 25 using a mask movable mirror 24.

By way of the catadioptric projection optical system 26, the light from the pattern formed in the photomask 21 forms a mask pattern image onto a wafer 27 which is a photosensitive substrate. The wafer 27 is held parallel to the XY plane on a wafer stage 29 by way of a wafer holder 28. Also, on the wafer 27, a pattern image is formed in a rectangular exposure area having longer sides along the Y axis and shorter sides along the X axis so as to optically correspond to the rectangular illumination area on the photomask 21.

The wafer stage 29 is movable along the wafer surface (XY plane) in a two-dimensional fashion, whereas its positional coordinates are configured so as to be measured and positionally controlled by an interferometer 31 using a wafer movable mirror 30.

Also, in the depicted projection exposure apparatus, the inside of the projection optical system 26 is configured so as to keep an airtight state, whereas the gas within the projection optical system 26 is substituted by an inert gas.

Further, while the photomask 21, the mask stage 23, and the like are disposed in a narrow optical path between the illumination optical system 20 and the projection optical system 26, the inside of a casing 33 sealing and surrounding the photomask 21, mask stage 23, and the like is filled with an inert gas.

Also, while the wafer 27, the wafer stage 29, and the like are disposed in a narrow optical path between the projection optical system 26 and the wafer 27, the inside of a casing 34 sealing and surrounding the wafer 27, wafer stage 29, and the like is filled with nitrogen or an inert gas such as helium gas.

Thus, an atmosphere which hardly absorbs exposure light is formed over the whole optical path from the light source 19 to the wafer 27.

As mentioned above, the field area (illumination area) on the photomask 21 defined by the projection optical system 26 and the projection area (exposure area) on the wafer 27 are shaped like a rectangle having shorter sides along the X axis. Hence, as the mask stage 23 and the wafer stage 29, and the pbotomask 21 and the wafer 27, in consequence, are synchronously moved (scanned) along the shorter sides of the rectangular exposure area and illumination area, i.e., X axis, while the photomask 21 and the wafer 27 are positionally controlled by use of a driving system, the interferometers (25, 31), and the like, the mask pattern is scanned and exposed on the wafer 27 with respect to an area having a width equal to the longer sides of the exposure area and a length corresponding to the amount of scanning (amount of movement) of the wafer 27.

In the apparatus of FIG. 4, as a material for all of the optical members (lens compositions) making up the projection optical system 26, silica glass or calcium fluoride crystal is used. The reason why the optical members made of calcium fluoride crystal are used is to correct the chromatic aberration. It is preferable that at least a part of optical members made of silica glass, such as a lens and a photomask, constituting the projection optical system 26 be an optical member according to the present invention and it is more preferable that all of the lenses made of silica glass be optical members according to the present invention. And it is more preferable that the photomask be an optical member according to the present invention. An optical member made of silica glass according to the present invention is used for a substrate of the photomask 21 of which form doesn't have a specific limitation with a general dimension of a depth of 60 to 200 mm, a width of 60 to 200 mm and thickness of 1 to 7 mm; or a diameter of 100 to 300 mm, a thickness of 1 to 7 mm.

Figure 5:
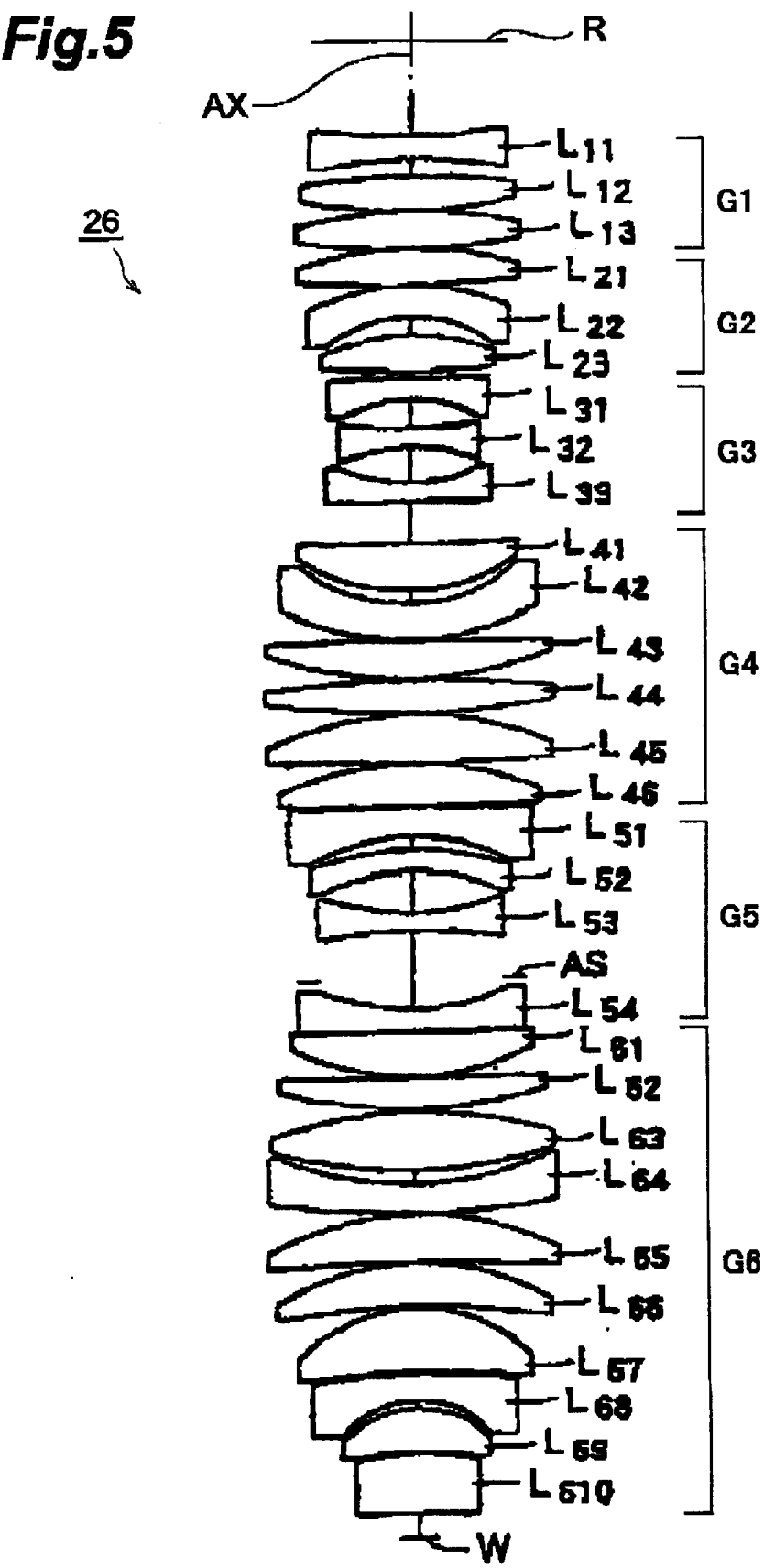
FIG. 5 is a schematic configuration view showing an example of a projection optical system utilizing optical members according to the present invention.

FIG. 5 is a schematic view showing an example of lens configuration of the projection optical system 26 with respect to FIG. 4.

The projection optical system 26 shown in FIG. 5 has a first lens group G1 with positive power, a second lens group G2 with positive power, a third lens group G3 with negative power, a fourth lens group G4 with positive power and a fifth lens group G5 with negative power in order from a reticule R side as the first object and has a nearly telecentric configuration at the side of the object (the reticule R side) and the image side (the wafer W side) to have a reduction ratio. In this projection optical system, N.A. is 0.6 with a projection scaling ratio being 1/4.

In this projection optical system, lenses made of calcium fluoride single crystal are used for six places of L45, L46, L63, L65, L66 and L67 among the lenses making up lens groups of from G1 to G6 for the purpose of correcting the chromatic aberration and silica glasses are used for other lenses than the above six places. It is preferable that an optical member according to the present invention be used for at least one lens except L45, L46, L63, L65, L66 and L67 among the lenses making up lens groups from G1 to G6 and it is preferable that optical members according to the present invention be used for all of the other lenses besides L45, L46, L63, L65, L66 and L67.

In this way, by using an optical member according to the present invention for at least one lens making up the optical system, the transmission of the entire optical system can be maintained at a high level. In the case that all of the lenses made of silica glass making up the projection optical system are optical members according to the invention, the transmission property of the entire optical system is further increased. And by using an optical member according to the invention for the photomask substrate, high light transmission property is achieved and local thermal expansion of said substrate can be controlled. Accordingly, by using a reduction projection exposure apparatus equipped with such optical members, a high resolution in a pattern transferring process can be achieved.

Though the present invention is described in more detail based on the Examples in the following, the present invention is not at all limited to the following Examples.

EXAMPLES 1 TO 6 AND COMPARATIVE EXAMPLES 1 TO 12

Silica glass ingots of Examples 1 to 6 and Comparative Examples 1 to 12 were fabricated by using a silica glass manufacturing apparatus through the direct method shown in FIG. 1. That is to say, by allowing the tube placed in the center of the silica glass burner 7 with multi-tubular structure shown in FIG. 2 to eject an organosilicon compound and an nitrogen gas and by allowing the tubes placed around the tube placed in said center to emit oxygen gas and hydrogen gas, silica glass fine particles (soot) were synthesized through oxidizing reaction of the organosilicon compound in the burning flame. The silica glass fine particles were deposited on the top of the silica glass target 5 with a diameter of 200 mm rotating at a speed of 7 revolution per minute, rocking with 80 mm of movement distance and 90 seconds of period and performing pulling down movement and at the same time were melted by the heat of the flame to obtain silica glass ingot IG with a diameter from 150 to 250 mm and a length of from 300 to 600 mm. Table 1 shows

|  |  | A | B |
|---|---|---|---|
| 21: | first tube | 4.0 | 6.0 |
| 22: | second tube | 7.5 | 10.1 |
| 23: | third tube | 11.5 | 13.9 |
| 24. | fourth tube | 31.5 | 35.5 |
| 25: | fifth tube | 2.5 | 4.9 |
| 26: | sixth tube | 71.0 | 77.0 |
| 27: | seventh tube | 4.5 | 6.9 |

TABLE 1

|  |  | Flow rate of material | Target descent speed | Gas flow amount [slm] | | | | | | $O_2/H_2$ ratio | | | The total $O_2$/ the total $H_2$ ratio |
|---|---|---|---|---|---|---|---|---|---|---|---|---|---|
|  |  |  |  | First $H_2$ | First $O_2$ | Second $H_2$ | Second $O_2$ | Third $H_2$ | Third $H_2$ | | | | |
|  | Material | [g/min] | [mm/hr] | (d) | (e) | (f) | (g) | (h) | (i) | e/d | g/f | i/h | (a/b) |
| Example 1 | HDMS | 10.5 | 1.6 | 60 | 43 | 120 | 72 | 250 | 113 | 0.72 | 0.60 | 0.44 | 0.530 |
| Example 2 | HDMS | 10.5 | 1.4 | 50 | 43 | 100 | 72 | 240 | 106 | 0.86 | 0.72 | 0.44 | 0.567 |
| Example 3 | HDMS | 10.5 | 1.6 | 50 | 43 | 120 | 72 | 230 | 101 | 0.86 | 0.60 | 0.44 | 0.540 |
| Example 4 | HDMS | 10.5 | 1.6 | 50 | 43 | 120 | 72 | 240 | 106 | 0.86 | 0.60 | 0.44 | 0.539 |
| Example 5 | HDMS | 15.7 | 2.4 | 50 | 50 | 120 | 72 | 260 | 114 | 1.00 | 0.60 | 0.44 | 0.549 |
| Example 6 | HDMS | 5.3 | 0.8 | 30 | 50 | 120 | 72 | 220 | 97 | 1.67 | 0.60 | 0.44 | 0.592 |
| Comparative Example 1 | HDMS | 14.4 | 2.4 | 75 | 45 | 150 | 66 | 240 | 106 | 0.60 | 0.44 | 0.44 | 0.467 |
| Comparative Example 2 | HDMS | 5.3 | 0.8 | 50 | 36 | 120 | 53 | 210 | 92 | 0.72 | 0.44 | 0.44 | 0.476 |
| Comparative Example 3 | HDMS | 15.7 | 2.0 | 60 | 48 | 120 | 53 | 250 | 110 | 0.80 | 0.44 | 0.44 | 0.491 |
| Comparative Example 4 | HDMS | 10.5 | 1.6 | 50 | 43 | 120 | 53 | 230 | 101 | 0.86 | 0.44 | 0.44 | 0.493 |
| Comparative Example 5 | HDMS | 15.7 | 2.4 | 50 | 50 | 120 | 53 | 270 | 119 | 1.00 | 0.44 | 0.44 | 0.505 |
| Comparative Example 6 | HDMS | 15.7 | 2.4 | 50 | 50 | 120 | 53 | 260 | 76 | 1.00 | 0.44 | 0.29 | 0.416 |
| Comparative Example 7 | HDMS | 10.5 | 1.6 | 40 | 50 | 120 | 53 | 230 | 101 | 1.25 | 0.29 | 0.44 | 0.523 |
| Comparative Example 8 | HDMS | 10.5 | 1.6 | 50 | 50 | 120 | 53 | 240 | 106 | 1.00 | 0.44 | 0.44 | 0.510 |
| Comparative Example 9 | OMCTS | 15.7 | 2.4 | 50 | 50 | 120 | 53 | 250 | 110 | 1.00 | 0.44 | 0.44 | 0.507 |
| Comparative Example 10 | OMCTS | 10.5 | 1.6 | 50 | 50 | 120 | 35 | 230 | 101 | 1.00 | 0.29 | 0.44 | 0.465 |
| Comparative Example 11 | OMCTS | 5.3 | 0.8 | 50 | 50 | 120 | 53 | 220 | 97 | 1.00 | 0.44 | 0.44 | 0.513 |
| Comparative Example 12 | MTMS | 10.5 | 1.6 | 50 | 10 | 120 | 35 | 260 | 76 | 0.20 | 0.29 | 0.29 | 0.281 | kind and flow amount of materials emitted from the burner 7; the first hydrogen gas amount, the first oxygen gas amount, and the ratio of the first oxygen gas amount to the first hydrogen gas amount; the second hydrogen gas amount, the second oxygen gas amount, and the ratio of the second oxygen gas amount to the second hydrogen gas amount; the third hydrogen gas amount, the third oxygen gas amount, and the ratio of the third oxygen gas amount to the third hydrogen gas amount, the ratio of the total oxygen amount to the total hydrogen amount, descent speed of the target in each Example and Comparison Example. In any of Example 1 to 6 and Comparative Examples 1 to 12, the organosilicon compound with the purity of 99.99% or more, Fe concentration of 10 ppb or less concentrations of Ni and Cr or 2 ppb or less respectively was used with the flow amount of the nitrogen gas which was the carrier gas of 3.5 slm. The dimensions of the tubes of the burners in FIG. 2 are shown receptively as follows (where A means internal diameter and B means external diameter).

For each of the thus obtained Examples 1 to 6 and Comparative Examples 1 to 12, formyl radical concentration generated by the X-ray irradiation, the hydroxyl group concentration, hydrogen molecule concentration, sodium concentration and internal absorption coefficient with respect to light having a wavelength of 193.4 nm were measured.

In measuring the internal absorption coefficient with respect to light having a wavelength of 193.4 nm, a sample, in a shape having a diameter of 60 mm and a thickness of 10 mm, was cut out from a part of 100 mm inside from the ingot top (the ingot head) and in the center in the diameter direction of each ingot to be used for as a measurement test sample. Precision abrasion was applied on the two surfaces facing each other of the sample go that the degree of parallelization, that is to say, the angle of polished surfaces opposed to each other was within 10 seconds, the plane degree was within three Newton rings for each side, the surface coarseness exhibits rms=10 angstroms or less for each side and the sample was polished to have the thickness of 10±0.1 mm as a final form. In addition, finishing polishing processing was applied with SiO$_2$ powder of high purity so that no abrasive remains on the surface. For the thus obtained samples, the internal loss coefficient with respect to light having a wavelength of from 190 to 400 nm was measured by using a spectrophotometer adjusted by a method described in Japanese Patent Application Laid-Open No. HEI 7-63680 and Japanese Patent Application Laid-Open No. HEI 11-211613. The internal absorption coefficient was calculated out by subtracting the internal scattering coefficient from the internal loss coefficient. As the internal loss coefficient of the synthesized silica glass at 193.4 nm which was an oscillating wavelength of the ArF excimer laser was 0.0015 cm$^{-1}$, the absorption coefficient of each sample at 193.4 nm shown in Table 2 had the value obtained by subtracting the internal scattering loss coefficient from the internal loss coefficient.

Next, in an ingot of silica glass in each Examples and Comparative Examples, a sample was cut out from the close area where the samples were cut out for the measurement of the internal absorption coefficient to have a shape of 10×2.7×2.3 mm to be used in the measurement of the formyl radical concentration. The surface of each sample was finished with precise polishing. Those samples were irradiated with X-rays under the following conditions:

X-ray irradiation apparatus: fluorescent X-ray analytical apparatus (made by Rigaku Denki: RIX3000)

X-ray tubular bulb: Rhodium (Rh) tubular bulb tube voltage: 50 kV tube current: 2 mA X-ray irradiation time: 22 seconds Under those conditions the X-ray irradiation dosage applied to the samples is about 0.01 Mrad (Mega rad).

Within one minute after the X-ray irradiation the samples are put into a Dewar flask containing liquid nitrogen to cool down the samples at the liquid nitrogen temperature (77 K) to carry out the ESR (electron spin resonance) measurement to determine the quantity of the formyl radical concentration under the following conditions:

apparatus: electron spin resonant apparatus (made by JEOL Ltd.: JES-RE2X)

sample temperature: 77 K microwave frequency: 9.2 GHz microwave power: 1 mW standard sample: copper sulfate 5 hydrate For the measurement of hydroxyl group concentration, the samples used for the above mentioned measurement of the internal absorption coefficient were used as they were. And the hydroxyl group concentration was determined in quantity by measuring the absorption amount of 1.38 μm belonging to the hydroxyl group by using an infrared spectrophotometer. And the samples used for the hydroxyl concentration measurement were used for hydrogen molecular concentration measurement by a laser Raman spectrophotometer. Light emitted from an argon ion laser (output power 400 mW) with the oscillating wavelength of 488 nm was directed into the samples to measure the intensity at 800 cm$^{-1}$ (at a peak due to the vibration of the basic structure of silica glass: reference light) among Raman scattered light irradiated in the direction perpendicular to the incident light direction and the intensity at 4135 cm$^{-1}$ (at a peak due to the vibration of hydrogen molecules), so as to take the intensity ratio.

Samples were cut out from a place adjacent to the place where the above mentioned samples were cut out of silica glass ingots to have a shape of 10 mm×10 mm×5 mm to measure the concentrations of chlorine (Cl), sodium (Na), and potassium (K) by radioactivation analysis by thermal neutron irradiation. And samples were cut out from the place adjacent to the place where those samples were cut out to have a shape of 10 mm×10 mm×5 mm to measure the concentrations of alkaline earth metal, transmission metal and aluminum (Al) by an inductively coupled plasma atomic emission spectroscopy. The value of the Na concentration is exhibited in Table 1. The Na concentrations according Examples 1 to 6 are all 0.002 ppm or less which confirmed that only a minor amount remains without affecting the absorption loss of light having the wavelength of 193.4 nm. In addition, the Cl concentration was below the minimum detectable level (0.1 ppm) for all the samples which confirms that the chloride-free silica glass had been achieved by using organosilicon compound as the material gas. Still further, the K concentration was below the minimum detectable level (50 ppb) for all the samples. Each of the element concentrations of alkaline earth metals of Mg, Ca, transition metals Ti, V, Cr. Mn, Fe, Co, Ni, Cu, Zn, and Al were 20 ppb or less for all the samples in Examples 1 to 6 and Comparative Examples 1 to 12.

Figure 6:
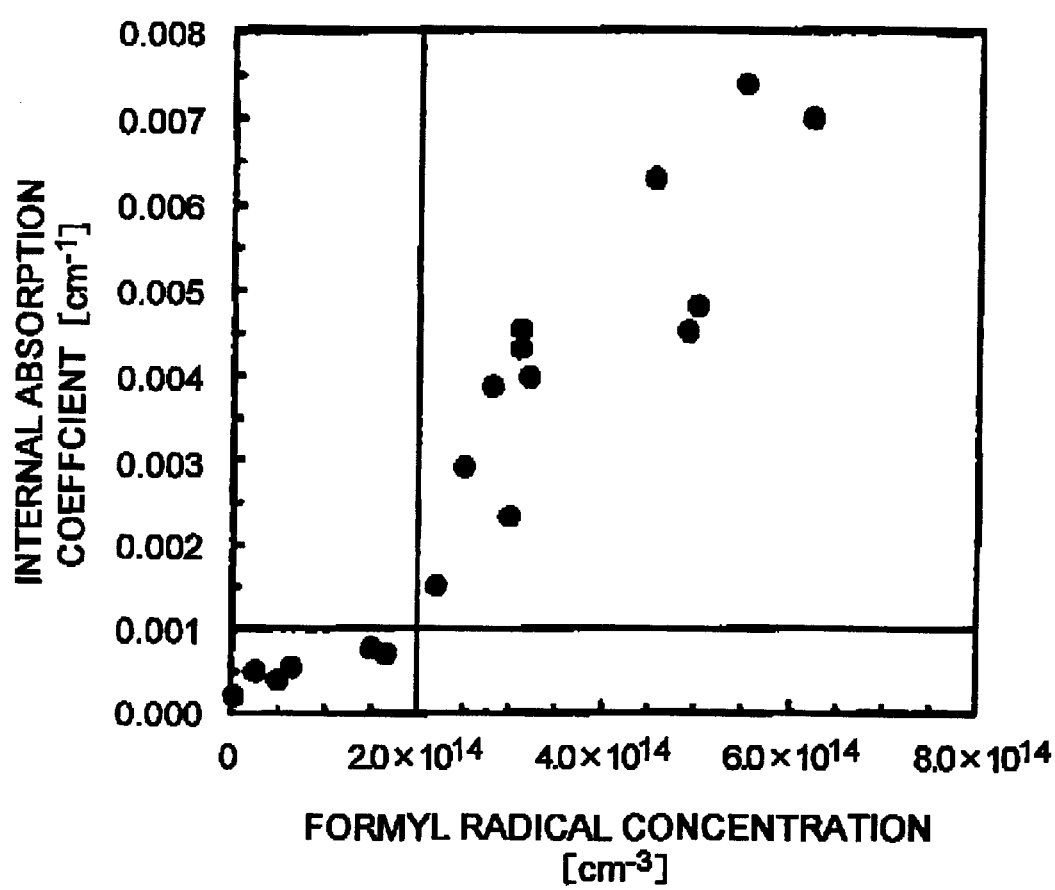
FIG. 6 is a graph showing the relation between the absorption coefficient with respect to light having a wavelength of 193.4 nm and the concentration of formyl radical obtained in Examples 1 to 6 and Comparative examples 1 to 12.

For each of Examples 1 to 6 and Comparative Examples 1 to 12, the measurement results for the formyl radical concentration generated by the X-ray irradiation, the hydroxyl group concentration, the hydrogen molecular concentration, the sodium concentration and the internal absorption coefficient with respect to light having a wavelength of 193.4 nm are shown in Table 2. The relation between the absorption coefficient of silica glass with respect to light having a wavelength of 193.4 nm and the formyl radical concentration obtained by the above mentioned measurement are shown in FIG. 6.

TABLE 2

|  | Formyl radical concentration [cm$^{-3}$] | Hydroxyl group concentration [ppm] | Hydrogen molecule concentration [cm$^{-3}$] | Sodium atom concentration [ppm] | Internal absorption coefficient [cm$^{-1}$] |
| --- | --- | --- | --- | --- | --- |
| Example 1 | $1.7 \times 10^{14}$ | 1050 | $1.1 \times 10^{18}$ | 0.002 | 0.0007 |
| Example 2 | $2.6 \times 10^{13}$ | 1210 | $2.0 \times 10^{17}$ | 0.001 | 0.0005 |
| Example 3 | $1.5 \times 10^{14}$ | 1200 | $3.0 \times 10^{17}$ | 0.001 | 0.0008 |
| Example 4 | $6.5 \times 10^{13}$ | 1220 | $5.0 \times 10^{16}$ | 0.001 | 0.0006 |
| Example 5 | $5.1 \times 10^{13}$ | 1150 | $7.0 \times 10^{17}$ | 0.001 | 0.0004 |
| Example 6 | $3.2 \times 10^{12}$ | 1210 | $1.0 \times 10^{13}$ | 0.001 | 0.0002 |
| Comparative Example 1 | $5.5 \times 10^{18}$ | 780 | $2.0 \times 10^{18}$ | 0.001 | 0.0074 |
| Comparative Example 2 | $2.8 \times 10^{14}$ | 1160 | $1.1 \times 10^{18}$ | 0.004 | 0.0039 |

TABLE 2-continued

|  | Formyl radical concentration [$cm^{-3}$] | Hydroxyl group concentration [ppm] | Hydrogen molecule concentration [$cm^{-3}$] | Sodium atom concentration [ppm] | Internal absorption coefficient [$cm^{-1}$] |
|---|---|---|---|---|---|
| Comparative Example 3 | $3.1 \times 10^{14}$ | 1010 | $1.2 \times 10^{18}$ | 0.001 | 0.0045 |
| Comparative Example 4 | $3.2 \times 10^{14}$ | 1060 | $1.2 \times 10^{18}$ | 0.001 | 0.0040 |
| Comparative Example 5 | $3.1 \times 10^{14}$ | 1080 | $1.1 \times 10^{18}$ | 0.001 | 0.0043 |
| Comparative Example 6 | $4.5 \times 10^{14}$ | 1020 | $1.3 \times 10^{18}$ | 0.001 | 0.0063 |
| Comparative Example 7 | $3.0 \times 10^{16}$ | 1220 | $1.4 \times 10^{18}$ | 0.001 | 0.0023 |
| Comparative Example 8 | $2.2 \times 10^{18}$ | 1030 | $1.5 \times 10^{18}$ | 0.001 | 0.0015 |
| Comparative Example 9 | $6.2 \times 10^{18}$ | 730 | $5.0 \times 10^{18}$ | 0.008 | 0.0070 |
| Comparative Example 10 | $4.9 \times 10^{18}$ | 830 | $1.0 \times 10^{18}$ | 0.002 | 0.0045 |
| Comparative Example 11 | $5.0 \times 10^{14}$ | 800 | $5.0 \times 10^{16}$ | 0.009 | 0.0048 |
| Comparative Example 12 | $2.5 \times 10^{14}$ | 580 | $1.5 \times 10^{12}$ | 0.033 | 0.0029 |

As shown in Table 2, silica glass in any of Example 1 to 6, manufactured by setting the ratio (a/b) of the total oxygen gas amount (a) to the total hydrogen gas amount (b) ejected from the burner at 0.53 or more, had a $2 \times 10^{14}$ molecules/$cm^3$ or less concentration of formyl radical generated internally by X-ray irradiation, even though the silica glass was manufactured by the direct method using a organosilicon compound as a material. In any of Examples 1 to 6, the ratio (e/d) of the first oxygen gas amount (e) to the first hydrogen gas amount (d) was 0.7 or more and 2.0 or less, the ration (g/f) of the second oxygen gas amount (g) to the second hydrogen amount (f) was 0.5 or more and 1.0 or less, the ratio (i/h) of the third oxygen gas (i) to the third hydrogen gas (h) was 0.2 or more and 0.5 or less to be synthesized, and it was confirmed that in the thus obtained silica glass the absorption coefficient with respect to light having a wavelength of 193.4 nm that is the same as the wavelength of the ArF excimer laser was 0.001 $cm^{-1}$ or less.

Next, the silica glass ingot obtained in Examples 6 was formed to have the maximum diameter of 250 mm and the thickness of 70 mm. This silica glass indicated the maximum differential refractive index within the excimer laser irradiation region as $\Delta n \leq 2 \times 10^{-6}$, the maximum birefringence of 2 nm per centimeter and the concentrations of each element of alkaline earth metal Mg, Ca, Al, transition metals Ti, V, Cr, Mn, Fe, Co, Ni, Cu, Zn are respectively 20 ppb or less concentration of Na, alkaline metal is 2 ppb or less, and K impurity concentration is 50 ppb or less over the entire member region. The projection optical system shown in FIG. 5 was manufactured by using the silica optical glass and evaluated the image formation function in the case that the ArF excimer laser was used as a light source in a the reduction projection exposure apparatus (stepper) in FIG. 4 equipped with the optical system. As a result, 0.19 μm was achieved for the width of lines and spaces which confirms that effective image forming function was obtained as an ArF excimer laser stepper.

EXAMPLES 7 TO 9 AND COMPARATIVE EXAMPLE 13 TO 20

In the same way as Example 1, silica glass was synthesized in Examples 7 to 9 and the Comparative Example 13 to 20 by utilizing the silica glass manufacturing apparatus shown in FIG. 1. In each of the Examples and the comparative examples, the conditions of the materials, oxygen gas and hydrogen gas ejected from the burner shown in FIG. 2 are shown in Tables 3 and 4.

TABLE 3

|  |  | Flow rate of material [m/sec] | Gas flow amount [slm] | | | | | | Flow rate of first $H_2$ [m/sec] |
|---|---|---|---|---|---|---|---|---|---|
|  | Material |  | First $H_2$ (d) | First $O_2$ (e) | Second $H_2$ (f) | Second $O_2$ (g) | Third $H_2$ (h) | Third $O_2$ (i) |  |
| Example 7 | HTMS | 6.5 | 50.0 | 43.0 | 120 | 72.0 | 248 | 109 | 56.3 |
| Example 8 | HMDS | 4.7 | 50.0 | 43.0 | 100 | 72.0 | 248 | 109 | 34.1 |
| Example 9 | HMDS | 5.2 | 50.0 | 50.0 | 120 | 72.0 | 250 | 110 | 41.5 |
| Comparative Example 13 | OMCTS | 11.5 | 75.0 | 45.0 | 150 | 66.0 | 255 | 112 | 115.0 |
| Comparative Example 14 | HMDS | 10.0 | 60.0 | 48.0 | 120 | 52.8 | 252 | 111 | 93.0 |
| Comparative Example 15 | TMOS | 9.1 | 50.0 | 50.0 | 120 | 52.8 | 248 | 109 | 80.0 |
| Comparative Example 16 | HMDS | 11.9 | 50.0 | 50.0 | 120 | 72.0 | 252 | 74 | 112.5 |

TABLE 3-continued

|  | Material | Flow rate of material [m/sec] | Gas flow amount [slm] | | | | | | Flow rate of first $H_2$ [m/sec] |
|---|---|---|---|---|---|---|---|---|---|
|  |  |  | First $H_2$ (d) | First $O_2$ (e) | Second $H_2$ (f) | Second $O_2$ (g) | Third $H_2$ (h) | Third $O_2$ (i) |  |
| Comparative Example 17 | OMCTS | 8.1 | 50.0 | 36.0 | 120 | 72.0 | 250 | 110 | 70.8 |
| Comparative Example 18 | MTMS | 10.5 | 40.0 | 50.0 | 120 | 35.2 | 251 | 110.5 | 100.3 |
| Comparative Example 19 | MTMS | 8.5 | 50.0 | 43.0 | 140 | 72.0 | 252 | 111 | 73.0 |
| Comparative Example 20 | HMDS | 7.3 | 60.0 | 43.0 | 120 | 72.0 | 251 | 110.5 | 66.9 |

TABLE 4

|  | $O_2/H_2$ ratio | | | The total $O_2$/ the total $H_2$ ratio | Ratio of value obtained by subtracting $O_2$ consumed by the combustion from the total $O_2$ to the total $H_2$ |
|---|---|---|---|---|---|
|  | e/d | g/f | i/h | (a/b) | ([a − c]/b) |
| Example 7 | 0.860 | 0.600 | 0.440 | 0.536 | 0.498 |
| Example 8 | 0.860 | 0.720 | 0.440 | 0.563 | 0.523 |
| Example 9 | 1.000 | 0.600 | 0.440 | 0.552 | 0.496 |
| Comparative Example 13 | 0.600 | 0.440 | 0.440 | 0.465 | 0.420 |
| Comparative Example 14 | 0.600 | 0.440 | 0.440 | 0.490 | 0.435 |
| Comparative Example 15 | 1.000 | 0.440 | 0.440 | 0.507 | 0.451 |
| Comparative Example 16 | 1.000 | 0.600 | 0.293 | 0.464 | 0.409 |
| Comparative Example 17 | 0.720 | 0.600 | 0.440 | 0.519 | 0.500 |
| Comparative Example 18 | 1.250 | 0.293 | 0.440 | 0.476 | 0.438 |
| Comparative Example 19 | 0.860 | 0.514 | 0.440 | 0.511 | 0.475 |
| Comparative Example 20 | 0.717 | 0.600 | 0.440 | 0.523 | 0.487 |

Figure 7:
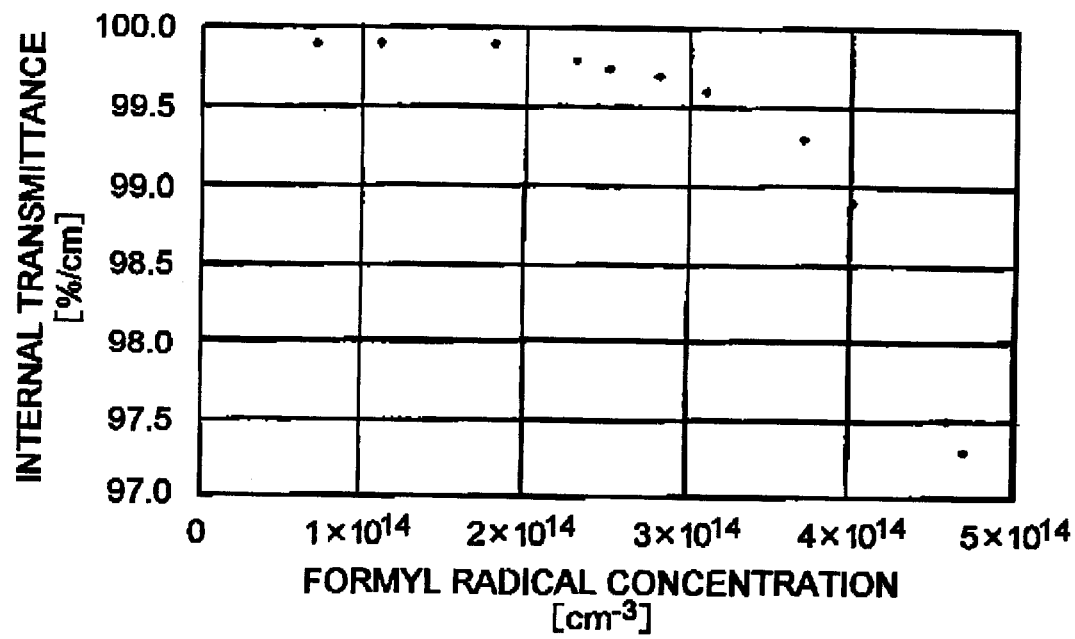
FIG. 7 is a graph showing the relation between the internal transmittance with respect to light having a wavelength of 193.4 nm and the concentration of formyl radical obtained in Examples 7 to 9 and Comparative examples 13 to 20.
Figure 8:
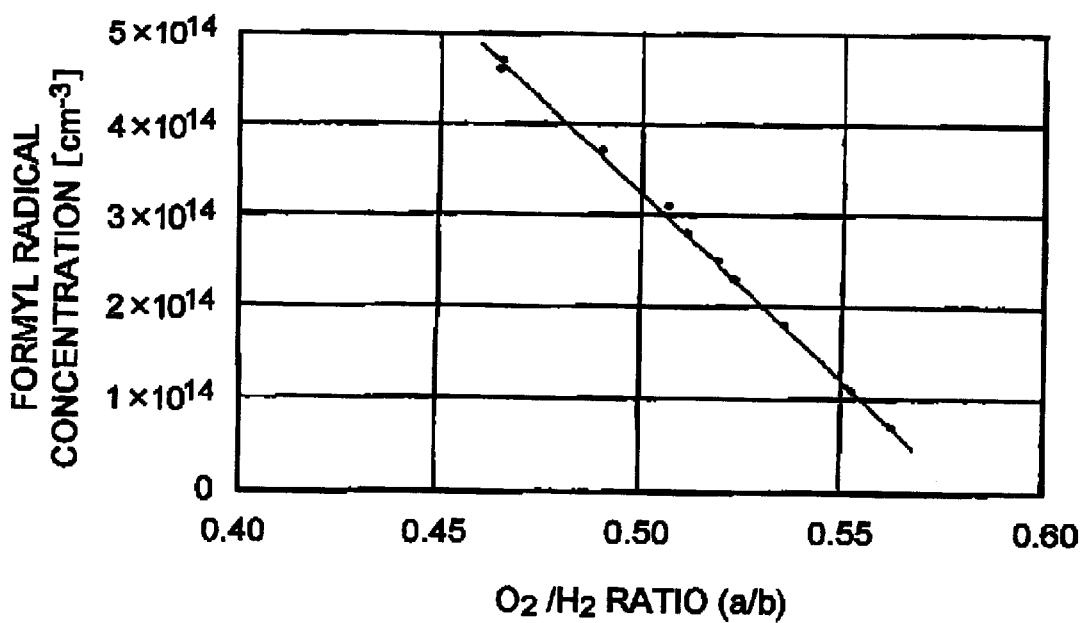
FIG. 8 is a graph showing the relation between a ratio (a/b) of the total oxygen gas amount (a) to the total hydrogen amount (b) and the concentration of formyl radical obtained in Examples 7 to 9 and Comparative examples 13 to 20.
Figure 9:
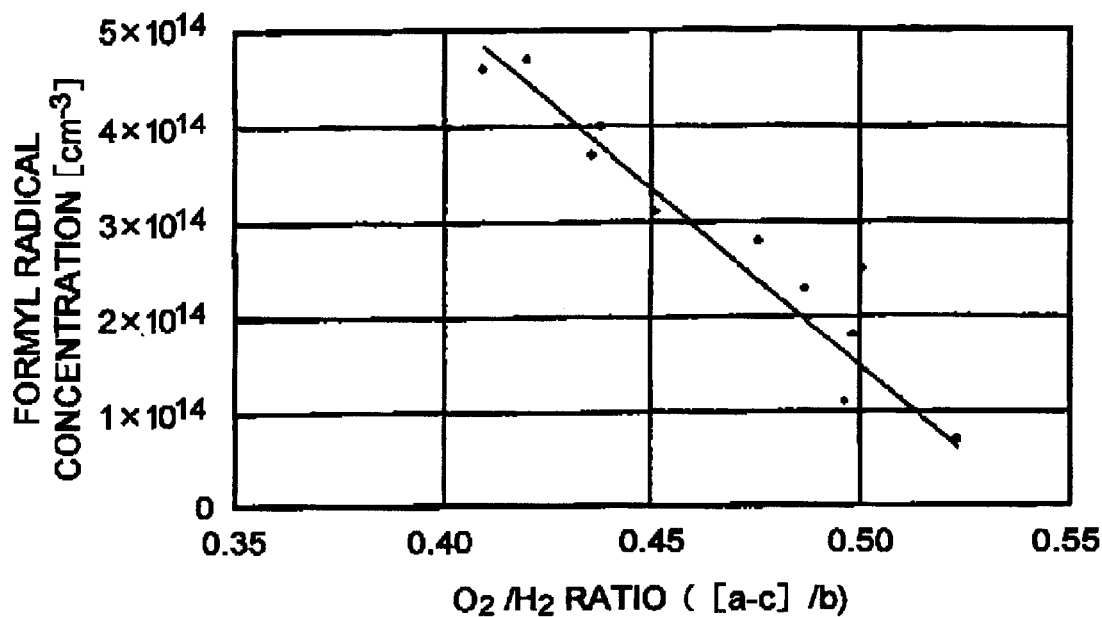
FIG. 9 is a graph showing the relation between a ratio ([a-c]/b) of the oxygen gas amount (a-c) by subtracting the oxygen gas amount (c) consumed by combustion of the organosilicon compound from the entire oxygen gas amount (a) through the combustion of the material obtained in Examples 7 to 9 and Comparative examples 13 to 20.
Figure 10:
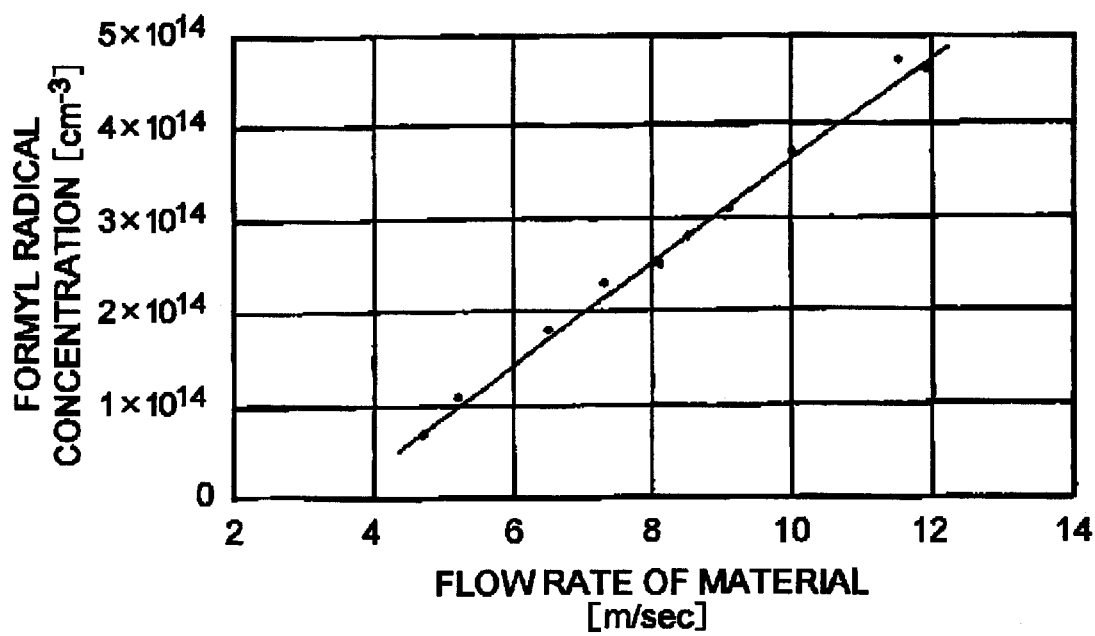
FIG. 10 is a graph showing the relation between the flow rate of the material and the concentration of formyl radical obtained in the Examples 7 to 9 and the Comparative examples 13 to 20.
Figure 11:
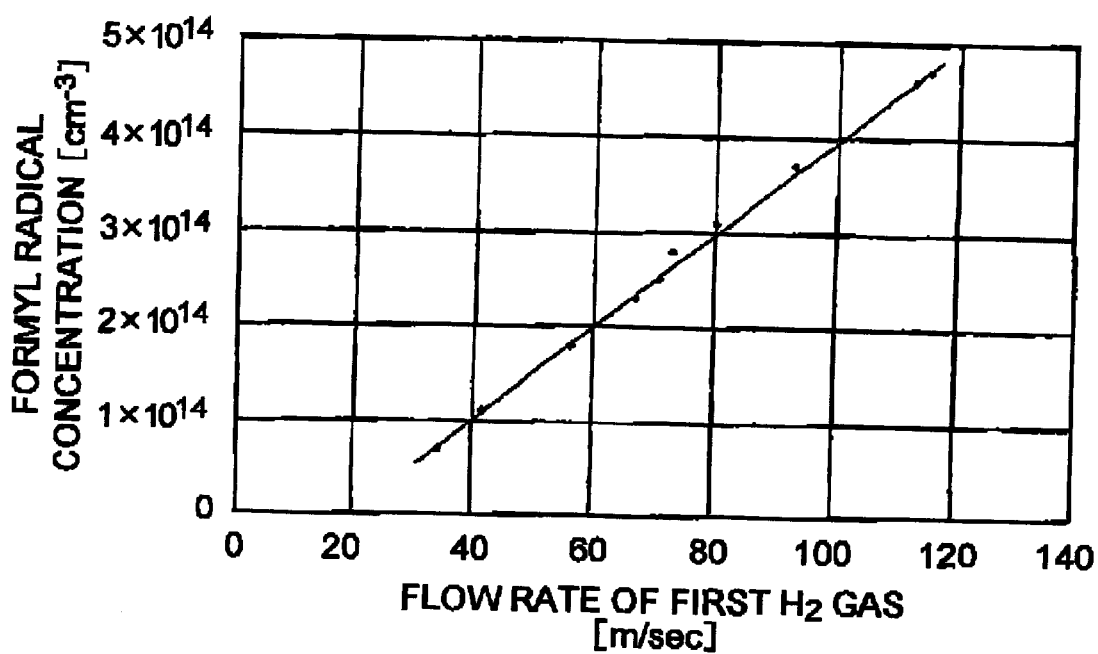
FIG. 11 is a graph showing the relation between the flow rate of the first hydrogen gas and the concentration of formyl radical obtained in Examples 7 to 9 and the Comparative examples 13 to 20.

In this way, a plurality of silica glass ingots are manufactured for each of Examples 7 to 9 and Comparative Examples 13 to 20. In Example 8 and Comparative Examples 13,14,18 and 19, heat treatment and hydrogen atmosphere treatment were carried out following the flow chart in FIG. 3B, respectively. In Example 9 and Comparative Example 20, only the hydrogen atmosphere treatment was carried out. In each of those Examples and Comparative Examples, the oxygen partial pressure and the temperature in the atmosphere during the heat treatment, and the temperature during the hydrogen atmosphere treatment are shown in FIG. 5. From the ingot thus obtained in each of Examples and Comparative Examples, test pieces were cut out and polished to obtain atest sample for measurement. Using these samples in the same way as Example 1, the concentration of formyl radical generated after X-ray irradiation, the hydroxyl group concentration, the hydrogen molecule concentration, the sodium atom concentration and the internal transmittance with respect to light with a wavelength of 193.4 nm were measured. The results are shown in Table 5. The relation between the internal transmittance with respect to light having a wavelength of 193.4 nm and the formyl radical concentration are shown in FIG. 7; the relation between the ratio (a/b) of the total oxygen gas amount (a) to the total hydrogen gas amount (b) and the formyl radical concentration are shown in FIG. 8; the relation between the ratio ([a−c]/b) of the oxygen gas amount (a−c) obtained by subtracting the oxygen gas amount (c) consumed by the combustion of the organosilicon compound from the total oxygen gas amount (a) to the total hydrogen gas amount (b) and the formyl radical concentration are shown in FIG. 9; the relation between the flow rate of the mixed gas of the organosilicon compound and the carrier gas and the formyl radical concentration are shown in FIG. 10; the relation between the first hydrogen gas flow rate and the formyl radical concentration are shown in FIG. 11, respectively.

TABLE 5

| | | Heat treatment | | Temp. of H$_2$ atmosphere treatment [°C.] | Formyl radical concentration [cm$^{-3}$] | Hydroxyl group concentration [ppm] | Hydrogen molecule concentration [cm$^{-3}$] | Sodium atom concentration [ppb] | Internal transmittance [%/cm] |
| --- | --- | --- | --- | --- | --- | --- | --- | --- | --- |
| | Process | Partial pressure of O$_2$ [atm] | Temp. [°C.] | | | | | | |
| Example 7 | FIG. 3B | 0.21 | 1000 | 500 | 1.8 × 10$^{14}$ | 1150 | 5 × 10$^{17}$ | not detected | 99.7 |
| Example 8 | FIG. 3A | 1 | 1100 | 400 | 7.0 × 10$^{13}$ | 1050 | 2 × 10$^{18}$ | not detected | 99.7 |
| Example 9 | none | — | — | 400 | 1.1 × 10$^{14}$ | 1170 | 3 × 10$^{17}$ | not detected | 99.7 |
| Comparative Example 13 | FIG. 3A | 0.21 | 1000 | 600 | 4.7 × 10$^{14}$ | 1000 | 3 × 10$^{18}$ | 30 | 97.1 |
| Comparative Example 14 | FIG. 3A | 0.21 | 900 | 400 | 3.7 × 10$^{14}$ | 1050 | 1 × 10$^{18}$ | not detected | 99.1 |
| Comparative Example 15 | FIG. 3B | 0.21 | 900 | 500 | 3.1 × 10$^{14}$ | 1080 | 1 × 10$^{18}$ | 5 | 99.4 |
| Comparative Example 16 | FIG. 3B | 0.21 | 1200 | 500 | 4.6 × 10$^{14}$ | 1220 | 1 × 10$^{17}$ | 25 | 97.3 |
| Comparative Example 17 | FIG. 3B | 0.21 | 1100 | 500 | 2.5 × 10$^{14}$ | 1200 | 3 × 10$^{17}$ | 5 | 99.6 |
| Comparative Example 18 | FIG. 3A | 1 | 1000 | 600 | 4.0 × 10$^{18}$ | 950 | 3 × 10$^{18}$ | 10 | 98.7 |
| Comparative Example 19 | FIG. 3A | 1 | 1100 | 400 | 2.8 × 10$^{14}$ | 1200 | 2 × 10$^{17}$ | 2 | 99.5 |
| Comparative Example 20 | none | — | — | 600 | 2.3 × 10$^{14}$ | 1150 | 5 × 10$^{17}$ | not detected | 99.6 |

In the burner shown in FIG. 2 as for all of the silica glass of Examples 7 to 9 manufactured by maintaining the ratio of the total oxygen gas amount to the total hydrogen gas amount at 0.53 or more, the formyl radical concentration after X-ray irradiation was 2×10$^{14}$ molecules/cm$_3$ or less, while as for all of the silica glass of comparison Examples 13 to 20 manufactured by maintaining the ratio of the total oxygen gas amount to the total hydrogen amount less than 0.53, the formyl radical concentration showed the value exceeding 2×10$^{14}$ molecules/cm$_3$. In Examples 7 to 9, accompanying with the increase of ratio (a/b) of the total oxygen gas amount to the total hydrogen gas amount, the concentration of formyl radical generated by X-ray irradiation showed the tendency to be lowered. In addition, accompanying the increase of the flow rate of the materials or the flow rate of the first hydrogen gas, it was recognized that the formyl radical concentration tended to increase.

EXAMPLES 10 to 14

In the same way as Example 1, using the silica glass manufacturing apparatus shown in FIG. 1, silica glass was synthesized in examples 10 to 14. For each of the examples the conditions relating to materials, oxygen gas and hydrogen gas ejected from the burner are shown in Table 6 and 7.

TABLE 6

| | | Flow rate of material [m/sec] | Gas flow amount [slm] | | | | | |
| --- | --- | --- | --- | --- | --- | --- | --- | --- |
| | Material | | First H$_2$ (d) | First O$_2$ (e) | Second H$_2$ (f) | Second O$_2$ (g) | Third H$_2$ (h) | Third O$_2$ (i) |
| Example 10 | OMCTS | 1.8 | 75.0 | 33.0 | 150 | 82.5 | 200 | 118.4 |
| Example 11 | HMDS | 2.2 | 60.0 | 27.0 | 120 | 69.6 | 200 | 104.7 |
| Example 12 | TMOS | 2.6 | 50.0 | 20.0 | 120 | 66.0 | 200 | 177.5 |
| Example 13 | HMDS | 1.3 | 50.0 | 25.0 | 120 | 72.0 | 200 | 114 |
| Example 14 | MTMS | 2.6 | 50.0 | 19.0 | 120 | 78.0 | 200 | 125 |

TABLE 7

| | O$_2$/H$_2$ ratio | | | The total O$_2$/ the total H$_2$ ratio | Ratio of value obtained by subtracting O$_2$ consumed by the combustion from the total O$_2$ to the total H$_2$ |
| --- | --- | --- | --- | --- | --- |
| | e/d | g/f | i/h | (a/b) | ([a − c]/b) |
| Example 10 | 0.440 | 0.550 | 0.592 | 0.550 | 0.50 |
| Example 11 | 0.450 | 0.580 | 0.524 | 0.530 | 0.48 |
| Example 12 | 0.400 | 0.550 | 0.588 | 0.550 | 0.52 |
| Example 13 | 0.500 | 0.600 | 0.570 | 0.570 | 0.54 |
| Example 14 | 0.380 | 0.650 | 0.625 | 0.600 | 0.57 |

In this way, a plurality of silica glass ingots were fabricated for each of the Examples. From those ingots, test pieces were cut out and polished to obtain test samples for measurement using those samples in the same way as Example 1, the concentration of formyl radical generated by X-ray irradiation, the hydroxyl group concentration, the hydrogen molecule concentration, the sodium concentration, the carbon concentration and the internal transmittance with respect to light having the wavelength of 193.4 nm were measured. And the absorption amount was measured by an ultraviolet spectrophotometer (Cary-5 manufactured by Varian Ltd.);

The increased amount of the refractive index was measured by a Fizeau type interferometer (Zygo Mark IV manufactured by Zygo Co., Ltd.); and, The birefringence induced by light with the wavelength 193.4 nm were measured by an automatic double refraction measuring apparatus (ADR manufactured by ORC Manufacturing Co., Ltd.), respectively. The results of those measurements are shown in Table 8.

As for all of the silica glass obtained in Examples 10 to 14, the concentration of formyl radical generated by X-ray irradiation was $2 \times 10^{14}$ molecules/cm$^3$ or less. By maintaining the ratio of the first hydrogen gas amount to the first oxygen gas amount at 0.5 or less and the ratio of the second hydrogen gas amount to the second oxygen gas amount at 0.55 or more, silica glass with the hydroxyl concentration of 800 ppm or more and 1300 ppm or less and with the hydrogen molecule concentration of $1 \times 10^{16}$/cm$_3$ or more and $4 \times 10^{18}$/cm$^3$ or less was obtained without carrying out the hydrogen atmosphere treatment and heat treatment after fabricating the ingot. The samples made of the silica glass all had transmittance of 99.5%/cm or less, absorption amount of 0.2 cm$^{-1}$ or less, the increased amount of refractive index of less than $1.5 \times 10^{-6}$ and the birefringence of less than 2.5 nm/cm, with respect to light having a wavelength of 193 nm.

What is claimed is:

1. An optical member made of silica glass synthesized by the direct method where a material gas comprising an organosilicon compound is allowed to react in an oxidizing flame,
said optical member having $1.0 \times 10^{12}$ molecules/cm$^3$ or more and $2 \times 10^{14}$ molecules/cm$^3$ or less concentration of formyl radical generated by X-ray irradiation whose dose is 0.01 Mrad or more and 1 Mrad or less.

2. An optical member according to claim 1, wherein the silica glass is synthesized by the direct method where a material gas comprising an organosilicon compound is allowed to react in an oxidizing flame with a ratio (a/b) of the total oxygen gas amount (a) to the total hydrogen gas amount (b) being 0.53 or more.

3. An optical member according to claim 1, wherein the internal absorption coefficient with respect to light having a wavelength of 190 nm or more is 0.001 cm$^{-1}$ or less.

4. An optical member according to claim 1, wherein a chlorine concentration is 0.1 ppm or less.

5. An optical member according to claim 1, wherein a hydroxyl group concentration is 800 ppm or more and 1300 ppm or less.

6. An optical member according to claim 1, wherein a hydrogen molecule concentration in said optical member is $1 \times 10^{16}$ molecules/cm$^3$ or more and $4 \times 10^{18}$ molecules/cm$^3$ or less.

7. An optical member according to claim 1, wherein a carbon atom concentration is 10 ppm or less.

8. An optical member according to claim 1, wherein a sodium concentration is 20 ppb or less.

9. An optical member according to claim 1, wherein an initial internal transmittance with respect to light emitted from an ArF excimer laser is 99.5%/cm or more.

10. An optical member according to claim 1, wherein internal absorption amount induced by light irradiation after being irradiated with $1 \times 10^6$ pulses of light with an energy density of 400 mJ/cm$^2$*p emitted prom an ArF excimer laser is 0.2 cm$^{-1}$ or less.

TABLE 8

| | Formyl radical concentration [cm$^{-3}$] | Hydroxyl group concentration [ppm] | Hydrogen molecule concentration [cm$^{-3}$] | Sodium atom concentration [ppb] | Carbon atom concentration [ppm] | Optical property with respect to light having a wavelength of 193.4 nm | | | |
|---|---|---|---|---|---|---|---|---|---|
| | | | | | | Internal transmittance [%/cm] | Internal absorption [cm$^{-3}$] | Increased amount of refractive index | Distortion [nm/cm] |
| Example 10 | $1.8 \times 10^{14}$ | 950 | $7 \times 10^{17}$ | 15 | <10 | 99.6 | <0.2 | $<1.5 \times 10^{-6}$ | <2.5 |
| Example 11 | $1.0 \times 10^{14}$ | 850 | $2 \times 10^{18}$ | not detected | <10 | 99.7 | <0.2 | $<1.5 \times 10^{-6}$ | <2.5 |
| Example 12 | $1.5 \times 10^{14}$ | 900 | $1 \times 10^{18}$ | 5 | <10 | 99.6 | <0.2 | $<1.5 \times 10^{-4}$ | <2.5 |
| Example 13 | $5.0 \times 10^{13}$ | 1000 | $5 \times 10^{17}$ | 10 | <10 | 99.7 | <0.2 | $<1.5 \times 10^{-6}$ | <2.5 |
| Example 14 | $1.8 \times 10^{14}$ | 1100 | $2 \times 10^{17}$ | not detected | <10 | 99.5 | <0.2 | $<1.5 \times 10^{-6}$ | <2.5 |

As described above, in accordance with the present invention, it is possible to manufacture silica glass having very low concentrations of formyl radical generated by the X-ray irradiation. In addition, by using an optical member made of such silica glass in an optical system of a reduction projection optical apparatus, high light transmission property and ultraviolet light resistance are obtained for the entire optical system in the case that it is used with light having a short wavelength such as a light emitted from an ArF excimer laser. Accordingly, in the above described apparatus high resolution is accomplished which couldn't be obtained in the case of optical members made of conventional silica glass.

11. An optical member according to claim 1, wherein an increased amount of the refractive index after being irradiated with $1 \times 10^6$ pulses of light with an energy density of 400 mJ/cm$^2$*p emitted from an ArF excimer laser is $1.5 \times 10^{-6}$ or less.

12. An optical member according to claim 1, wherein an maximum birefringence after being irradiated with $1 \times 10^6$ pulses of light with an energy density of 400 mJ/cm$^2$*p emitted from an ArF excimer laser is 2.5 nm/cm or less.

13. An optical member according to claim 1, wherein the optical member has a $3.2 \times 10^{12}$ molecules/cm$^3$ or more and $2 \times 10^{14}$ molecules/cm$^3$ or less concentration of formyl radical generated.

* * * * *